United States Patent
Nakamura et al.

(10) Patent No.: US 9,956,851 B2
(45) Date of Patent: May 1, 2018

(54) VEHICLE AIR CONDITIONER HAVING A DRAINAGE PORT

(71) Applicant: DENSO CORPORATION, Kariya, Aichi-pref. (JP)

(72) Inventors: Takahito Nakamura, Obu (JP); Ryo Kobayashi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 704 days.

(21) Appl. No.: 14/399,590

(22) PCT Filed: Apr. 17, 2013

(86) PCT No.: PCT/JP2013/002601
§ 371 (c)(1),
(2) Date: Nov. 7, 2014

(87) PCT Pub. No.: WO2013/168369
PCT Pub. Date: Nov. 14, 2013

(65) Prior Publication Data
US 2015/0089969 A1   Apr. 2, 2015

(30) Foreign Application Priority Data
May 11, 2012   (JP) .................................. 2012-109746

(51) Int. Cl.
*F25D 21/14*   (2006.01)
*B60H 1/32*   (2006.01)

(52) U.S. Cl.
CPC ........... *B60H 1/3233* (2013.01); *F25D 21/14* (2013.01)

(58) Field of Classification Search
CPC .............................. B60H 1/3233; F25D 21/14
(Continued)

(56) References Cited

U.S. PATENT DOCUMENTS

| 4,041,727 A * | 8/1977 | Maudlin ................. F24F 13/22 |
|---|---|---|
| | | 165/181 |
| 2001/0017038 A1 | 8/2001 | Aoki |

(Continued)

FOREIGN PATENT DOCUMENTS

| JP | 2001213140 A | 8/2001 |
|---|---|---|
| JP | 2006347481 A | 12/2006 |

(Continued)

OTHER PUBLICATIONS

International Search Report and Written Opinion (in Japanese with English Translation) for PCT/JP2013/002601, dated Jun. 4, 2013; ISA/JP.

*Primary Examiner* — Frantz Jules
*Assistant Examiner* — Steve Tanenbaum
(74) *Attorney, Agent, or Firm* — Harness, Dickey & Pierce, P.L.C.

(57) ABSTRACT

An interior unit includes a discharge water passage communicating with a drainage port and having a first space portion in which water inside an air conditioning casing flows down from a guide opening portion, and an upward wall portion and a downward wall portion which constitute a partition wall separating between the discharge water passage and a second space portion adjacent to the discharge water passage and preventing the water falling in the discharge water passage from flowing into the second space portion. A prevention wall extending upward from a bottom wall portion in the second space portion is provided, and an upper end of the prevention wall is higher than a position of a fixation portion in which the first casing member and the second casing member are fixed with each other.

10 Claims, 4 Drawing Sheets

(58) Field of Classification Search
USPC .......................................................... 62/285
See application file for complete search history.

(56) References Cited

U.S. PATENT DOCUMENTS

2010/0212347 A1* 8/2010 Kim .................... B60H 1/3233
62/285
2011/0005720 A1* 1/2011 Seto ................... B60H 1/00064
165/71

FOREIGN PATENT DOCUMENTS

| JP | 2010195384 A | 9/2010 |
| JP | 2012153261 A | 8/2012 |
| JP | 2013014269 A | 1/2013 |

* cited by examiner

VEHICLE AIR CONDITIONER HAVING A DRAINAGE PORT

CROSS REFERENCE TO RELATED APPLICATIONS

This application is a U.S. National Phase Application under 35 U.S.C. 371 of International Application No. PCT/JP2013/002601 filed on Apr. 17, 2013 and published in Japanese as WO 2013/168369 A1 on Nov. 14, 2013. This application is based on and claims the benefit of priority from Japanese Patent Application No. 2012-109746 filed on May 11, 2012. The entire disclosures of all of the above applications are incorporated herein by reference.

TECHNICAL FIELD

The present disclosure relates to a vehicle air conditioner in which water accumulated inside an air conditioning casing obtained by combining multiple casing members is discharged through a drainage port.

BACKGROUND ART

In Patent Document 1, a vehicle air conditioner is described, in which condensed water is prevented from leaking from between separation surfaces of a right-left separated-type air conditioning casing is prevented, and a condensed-water discharging performance is improved. The vehicle air conditioner includes an evaporator disposed in an interior part, and an air conditioning casing in which a first casing and a second casing are connected. The first casing includes a main drainage flow passage, and a first condensed-water discharge passage leading to the main drainage flow passage. The second casing includes an auxiliary drainage flow passage, and a second condensed-water discharge passage leading to the auxiliary drainage flow passage. A bottom surface of the first casing and/or a bottom surface of the second casing have a condensed-water discharge port through which condensed water generated in the evaporator flows to the main drainage flow passage and/or the auxiliary drainage flow passage.

In a vehicle air conditioner of the above-described Patent Document 1, both the first casing and the second casing have the condensed-water discharge passage. Hence, water on the bottom surface the air conditioning casing is discharged from the first condensed-water discharge passage to an exterior part of the air conditioning casing through the condensed-water discharge port and the main drainage flow passage, or is discharged from the second condensed-water discharge passage to the exterior part of the air conditioning casing through the condensed-water discharge port, the main drainage flow passage and the auxiliary drainage flow passage. In other words, a structure capable of discharging the water from both of the condensed-water discharge passages is provided.

PRIOR ART DOCUMENT

Patent Document

[Patent Document 1] JP Patent Publication No. 2010-195384

SUMMARY OF THE INVENTION

According to study of the inventors, since the vehicle air conditioner of Patent Document 1 includes the two condensed-water discharge passages and the two drainage ports, a metallic mold for forming the casing may have to be structured to provide the two drainage ports communicating with the respective condensed-water discharge passages. According to this, a shape of the metallic mold may become complicated, and a manufacturing cost of the metallic mold and a component cost may become further high.

It is an objective of the present disclosure to provide a vehicle air conditioner capable of discharging water from inside the air conditioning casing to an exterior through a drainage port communicating with a single discharge water passage, and further capable of preventing water leakage from between connection parts of multiple casing members.

A vehicle air conditioner includes an air conditioning casing having therein an air passage through which air flows to be blown into a vehicle compartment. The air conditioning casing includes a first casing member and a second casing member and is configured such that at least the first casing member and the second casing member are combined with each other. The vehicle air conditioner includes a heat exchanger disposed inside the air conditioning casing to adjust a condition of air that is to be blown into the vehicle compartment. The air conditioning casing includes a guide opening portion, a first space portion, a drainage port, a second space portion, a partition wall, a bottom wall portion, a prevention wall and a fixation portion. The guide opening portion communicates with the air passage such that water inside the air conditioning casing flows into the guide opening portion. The first space portion communicates with the guide opening portion such that the water falling from the guide opening portion due to gravity flows down in the first space portion. The drainage port communicates with the first space portion to discharge the water, which has flowed down from the first space portion, to an exterior of the air conditioning casing. The second space portion is located adjacent to the first space portion. The partition wall separates between the first space portion and the second space portion such that the water falling in the first space portion is prevented from entering the second space portion. The bottom wall portion is provided under the second space portion and defining the second space portion. The prevention wall extends upward from the bottom wall portion in the second space portion. In the fixation portion, the first casing member and the second casing member are fixed to each other. An upper end of the prevention wall is higher than a position of the fixation portion.

Accordingly, the water present inside the air conditioning casing flows down from the guide opening portion to the first space portion. The falling water in the first space portion is blocked by the partition wall so as not to flow into the second space portion, and flows in the first space portion, thereby being discharged to the exterior from the drainage port that communicates with the first space portion. Accordingly, the water inside the air conditioning casing follows a single discharge water pathway through which the water is discharged from the drainage port via the first space portion. Therefore, a metallic mold for a component of the air conditioning casing can be prevented from being complicated in shape. Moreover, according to the disclosure, even if the water penetrates into the second space portion gradually due to a long period of use, the water can be accumulated in the second space portion without leaking over the prevention wall until a water level in the second space portion reaches a height of the prevention wall because the prevention wall extends upward from the bottom wall portion defining the second space portion. Since the water inside the air conditioning casing flows down in the first space portion in principle without flowing into the second space portion, an amount of the water that reaches the second space portion is little and evaporable over time. Accordingly, a vehicle air conditioner can be provided, which is capable of discharging the water from inside the air conditioning casing to the exterior through the drainage port that communicates with the single first space portion and capable of preventing water leakage from the fixation portion between the multiple casing members to the exterior.

EMBODIMENTS FOR EXPLOITATION OF THE INVENTION

Hereinafter, multiple embodiments for implementing the present disclosure will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.
(First Embodiment)

Figure 1:
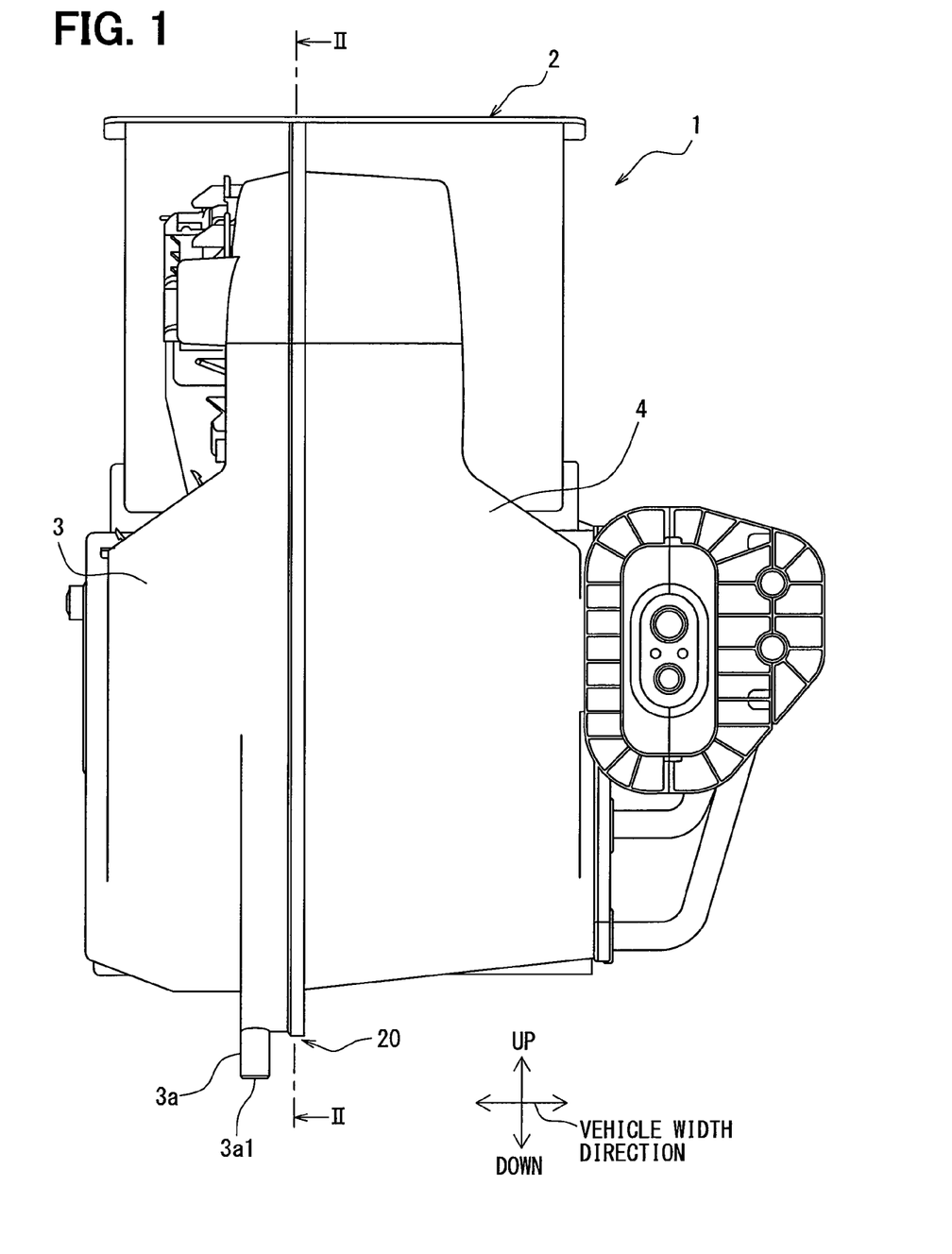
FIG. 1 is a front view showing an air conditioning casing of a vehicle air conditioner according to a first embodiment of the present disclosure.
Figure 2:
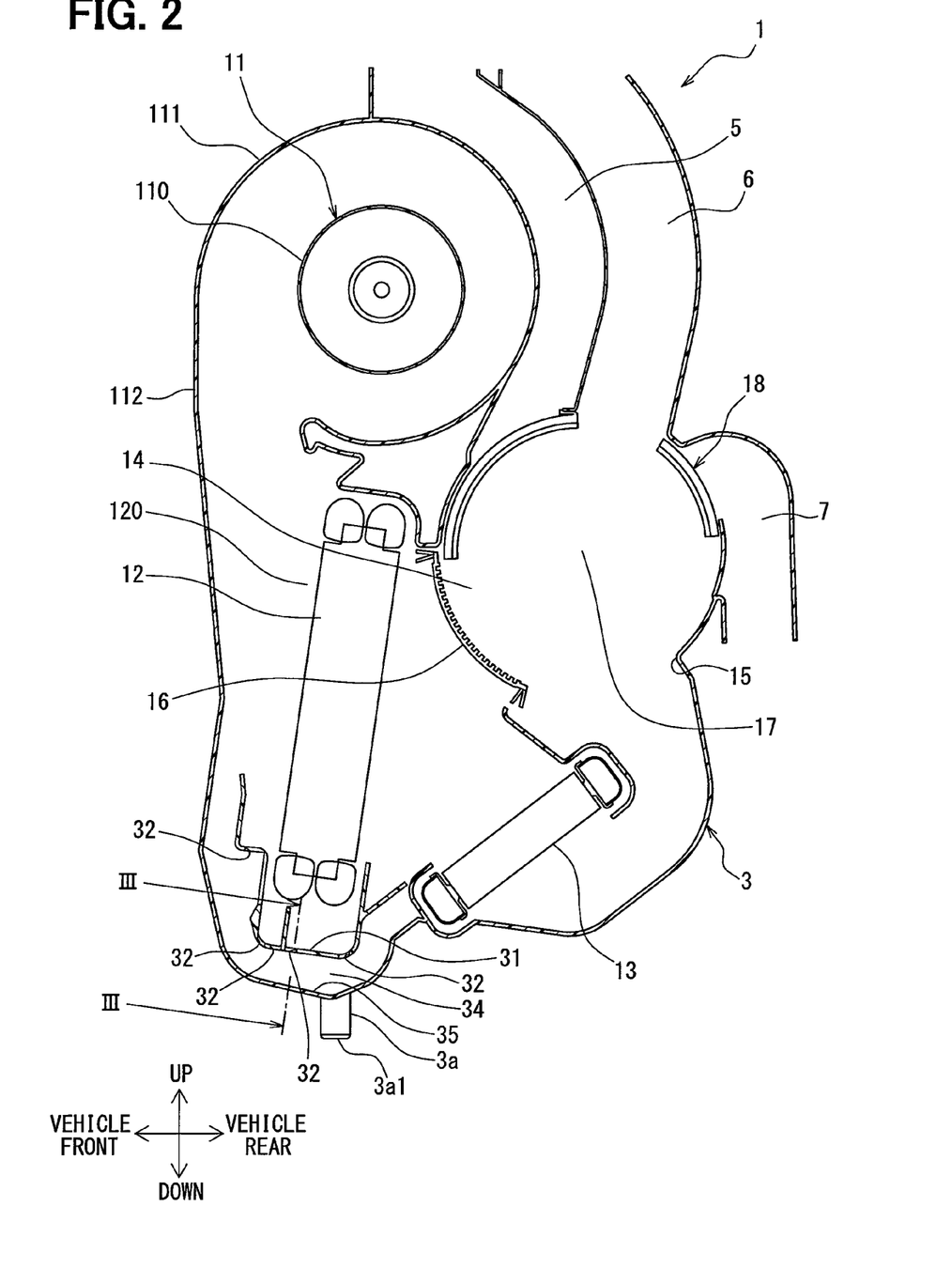
FIG. 2 is a schematic sectional diagram taken along a line II-II of FIG. 1.
Figure 3:
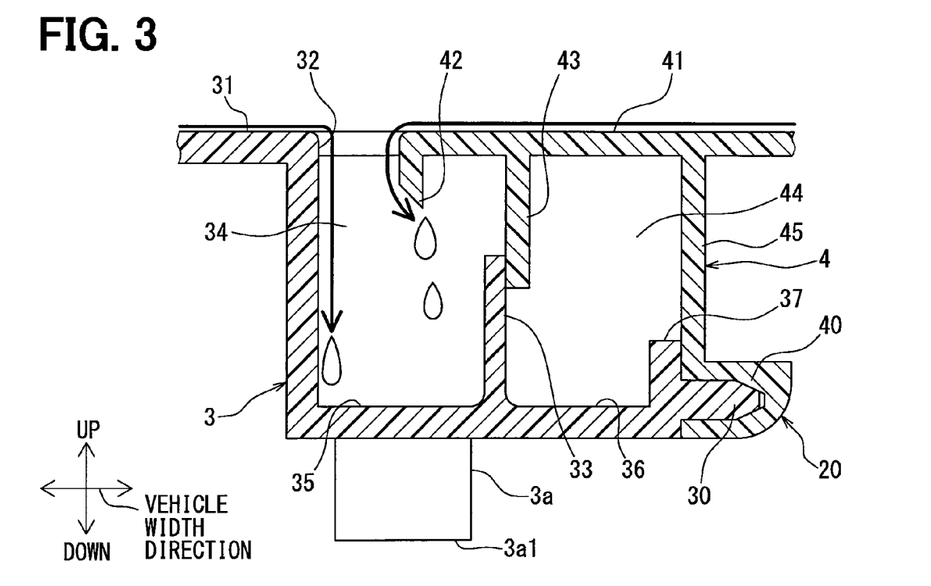
FIG. 3 is a schematic sectional diagram taken along a line III-III of FIG. 2.

A vehicle air conditioner of a first embodiment to which the present disclosure is applied will be described in reference to FIGS. 1 to 3. In FIGS. 1 and 3, an upward direction on the paper surfaces represents a vehicle upward direction, a downward direction on the paper surfaces represents a vehicle downward direction, and right-left direction on the paper surfaces represents a vehicle width direction. In FIG. 2, an upward direction on the paper surface represents the vehicle upward direction, a downward direction on the paper surface represents the vehicle downward direction, a left direction on the paper surface represents a vehicle front direction, and a right direction on the paper surface represents a vehicle rear direction. FIG. 2 is a drawing when a sectional surface taken along a line II-II of FIG. 1 is viewed in an arrow direction. FIG. 3 is a drawing when a sectional surface taken along a line III-III of FIG. 2 is viewed in an arrow direction, and a sectional surface regarding a second casing member 4 is further drawn on the drawing for facilitating understanding.

As shown in FIG. 1, an interior unit 1 of the vehicle air conditioner includes an air passage therein and includes an air conditioning casing 2 containing a variety of functional components. The air conditioning casing 2 is configured by combination of multiple casing members in which at least a first casing member 3 disposed in a left part of the vehicle and the second casing member 4 disposed in a right part of the vehicle are joined to each other.

The first casing member 3 and the second casing member 4 are connected in a connection portion extending in an up-down direction. The connection portion is provided, for example, by a fixation portion 20 where a protrusion portion provided on one connection edge surface is engaged with and fixed to a groove portion provided on the other connection edge surface. The fixation portion 20 is a connection portion extending in both the vehicle up-down direction and the vehicle front-rear direction.

The air conditioning casing 2 has a drainage port 3a through which water present inside the air conditioning casing 2 is discharged to an exterior. The drainage port 3a is disposed in a lowermost part of the air conditioning casing 2 at a position shifted in the vehicle width direction from a position of the fixation portion 20. The drainage port 3a has an outlet opening portion 3a1 at its end and is a pipe-like portion. In the first embodiment, the drainage port 3a is provided in the first casing member 3.

The interior unit 1 is disposed, for example, in a state shown in FIG. 2 below an instrumental panel located in a front part of a vehicle compartment of the vehicle, thereby providing a configuration in which an air blowing unit and an air conditioning unit, i.e. roughly-separated two parts are adjacent to each other. The air blowing unit has functions to draw an air (inside air) inside the vehicle compartment or an outside air outside the vehicle compartment into the interior unit 1, and the air blowing unit includes an inside-outside air switch box (not shown) in the vehicle width direction (direction perpendicular to the paper surface of FIG. 2).

The air blowing unit includes an electric blower 11. The blower 11 includes a centrifugal multi-blade fan 110 and a motor used for driving the fan. The centrifugal multi-blade fan 110 is disposed in a scroll casing 111. A duct portion 112 is provided on a downstream side of the scroll casing 111 in an air flow and constitutes a flow passage extending from an outlet of the scroll casing 111. The duct portion 112 defines a passage that introduces air blown from the air blowing unit into an evaporator 12. An outlet part of the air blowing unit is connected to an inlet part of the air conditioning unit by the duct portion 112.

In the air conditioning unit, the evaporator 12 and a heater core 13 are housed in the single and common air conditioning casing 2. The air conditioning casing 2 is provided by a molded product made of resin, such as polypropylene, which has some degree of elasticity and is superior in strength. The air conditioning casing 2 includes separated multiple casing members including a first casing member 3 and a second casing member 4. Devices such as the evaporator 12, the heater core 13 and an air mix door 16 are housed in the multiple casing members, and the multiple casing members are, subsequently, combined integrally into the air conditioning casing 2 by an engagement method such as snap-fitting or a fixation method using a metallic spring clip or a screw, for example.

In the present embodiment, the air conditioning casing 2 is formed integrally together with the scroll casing 111 and the duct portion 112. More specifically, parts of the scroll casing 111 and the duct portion 112 on left sides of in the vehicle width direction are integrally formed with the first casing member 3, and the other parts of the scroll casing 111 and the duct portion 112 on right sides of in the vehicle width direction are integrally formed with the second casing member 4.

An air inflow passage 120 is provided in a lower and rear part of the air conditioning casing 2, and an air blown by the air blowing unit flows into the air inflow passage 120 through the duct portion 112. Inside the air conditioning casing 2, the evaporator 12 is disposed immediately rearward of the air inflow passage 120 so as to extend across a whole area of a passage. The evaporator 12 is a cooling heat exchanger that cools air by absorbing heat from the air as latent heat of evaporation of refrigerant of a refrigeration cycle. The evaporator 12 may be used as an example of a heat exchanger that adjusts a condition of air that is to be blown into the vehicle compartment.

The evaporator 12 includes a core portion having multiple refrigerant tubes arranged to be distant from each other and outer fins, and header tanks connected to the multiple refrigerant tubes of the core portion. Additionally, an insulator 22c that prevents air leakage may be provided between the header tank and a wall part of the air conditioning casing 2. The core portion of the evaporator 12 has a rectangular flat-plate shape such that air passes through the core portion in a thickness direction of the rectangular flat-plate shape. In other words, the core portion is a heat exchange portion that extends so as to expand in a direction approximately perpendicular to a flow direction of air passing through the core portion. The core portion of the evaporator 12 is disposed in a state tilted from the vertical direction. Furthermore, the core portion of the evaporator 12 is tilted such that an upper end is located on a rear side of a lower end in the vehicle front-rear direction.

The heater core 13 is disposed on a downstream side (rear side) of the evaporator 12 in the air flow. The heater core 13 reheats cold air that has passed through the evaporator 12. A high-temperature engine coolant flows inside the heater core 13, and the heater core 13 is a heat exchanger that heats the air by using the coolant as a heat source.

A cold air passage 14, through which an air (cold air) bypasses the heater core 13, is provided in an upper half part of a region on a rear side of the evaporator 12 in the vehicle front-rear direction inside the air conditioning casing 2. A hot air passage 15, through which air (hot air) that has passed through the heater core 13 flows, is provided in a region extending from a rear side of the heater core 13 in the vehicle front-rear direction to an upper side of the heater core 13 in the vehicle up-down direction inside the air conditioning casing 2. The cold air passage 14 and the hot air passage 15 may be used as examples of an air passage through which air flows to be blown into the vehicle compartment.

An air mix door 16 is disposed rearward of the evaporator 12 in the vehicle front-rear direction and opens or closes the cold air passage 14 and the hot air passage 15. The air mix door 16 is capable of regulating a ratio in open area between these passages. The air mix door 16 adjusts a ratio in flow rate between an air (hot air) passing through the heater core 13 and an air (cold air) bypassing the heater core 13. The air mix door 16 is a sliding door in which a door body has a rack engaged with a pinion and accordingly moves parallel to adjust an opening degree of each passage.

A cold-hot air mix space 17 is provided on downstream sides of the cold air passage 14 and the hot air passage 15. In the cold-hot air mix space 17, the cold air from the cold air passage 14 and the hot air from the heater core 13 join together and mix with each other. In an upper part of the air conditioning casing 2, a defroster passage 5, which communicates with the cold-hot air mix space 17 and extends upward, is provided at a front position in the vehicle front-rear direction. The defroster passage 5 is connected to a defroster air outlet through a non-shown defroster duct. The defroster air outlet is open to inside the vehicle compartment, and a conditioned air is blown out through the defroster air outlet toward an inner surface of a front glass window of the vehicle.

In the upper part of the air conditioning casing 2, a face passage 6, which communicates with the cold-hot air mix space 17 and extends upward, is provided at a position adjacent to the defroster passage 5 on a rear side of the defroster passage 5 in the vehicle front-rear direction. The face passage 6 is connected to a face air outlet through a non-shown face duct. The face air outlet is open to inside the vehicle compartment, and a conditioned air is blown out through the face air outlet toward a head part of a passenger in the vehicle compartment. In a middle part or a lower part of the air conditioning casing 2, a foot passage 7, which communicates with the cold-hot air mix space 17 and extends downward. The foot passage 7 is connected to a foot air outlet through a non-shown foot duct. The foot air outlet is open to inside the vehicle compartment, and a conditioned air is blown out through the foot air outlet toward a foot area of the passenger in the vehicle compartment.

The defroster passage 5, the face passage 6 and the foot passage 7 are opened or closed by an air-outlet switch door 18 that is capable of opening or closing multiple opening portions. A so-called hinged door including a rotation shaft and a door body integrally connected to the rotation shaft, or a sliding door similar to the air mix door 16 may be used as the air-outlet switch door 18.

The drainage port 3a is provided in a bottom part of the air conditioning casing 2 for discharge of water inside the air conditioning casing 2 to an outside of the vehicle compartment. The water inside the air conditioning casing 2 includes a water penetrating into the air conditioning casing 2 together with air drawn into the air conditioning casing 2, and a condensed water generated on a surface of the evaporator 12. As shown in FIGS. 2 and 3, the drainage port 3a is provided to communicate with the discharge water passage 34 that is provided at a position below the evaporator 12 inside the air conditioning casing 2 and is not an air passage through which a condition air flows.

A guide opening portion 32 is provided in a part of the air conditioning casing 2 communicating with the air passage or in a part of the air conditioning casing 2 defining the air passage. The guide opening portion 32 includes an opening through which the water inside the air conditioning casing 2 falls into the discharge water passage 34 due to a gravity action. The guide opening portion 32 is an opening portion extending through a lower wall portion 31 of the first casing member 3 and a lower wall portion 41 of the second casing member 4, and the lower wall portions 31 and 41 are provided at positions communicating with the air passage. In other words, the guide opening portion 32 communicates with the air passage, and the water inside the air conditioning casing 2 flows into the guide opening portion 32. The lower wall portion 31 and the lower wall portion 41 are, for example, as shown in FIG. 2, supporting wall portions that support of a lower part of the evaporator 12, and multiple guide opening portions 32 may be provided on the supporting wall portions. The guide opening portion 32 is a rectangular or slit-like opening portion extending through the lower wall portion 31 or the lower wall portions 41.

In the air conditioning casing 2, an inner-circumferential edge part defining the opening of the guide opening portion 32 has a flow guide 42 having a shape tapered downward.

According to the flow guide 42, when the water inside the air conditioning casing 2 falls through the guide opening portion 32, the water flows down on a surface of the flow guide 42 and becomes a water droplet at a tapered part of the flow guide 42, thereby falling in the discharge water passage 34.

The fixation portion 20 is provided by combining and fixing a protrusion portion 30 of the first casing member 3 and a groove portion 40 of the second casing member 4 to each other. The first casing member 3 and the second casing member 4 are combined with each other by forming of the fixation portion 20, and a gutter-shaped space portion, i.e. a first space portion and a second space portion 44 are provided below the lower wall portion 31 and the lower wall portion 41. The discharge water passage 34 may be used as an example of the first space portion that is provided in the air conditioning casing 2 and communicates with the guide opening portion 32 and the drainage port 3a. In the first space portion, the water falling from the guide opening portion 32 due to gravity flows downward.

The air conditioning casing 2 includes a partition wall separating the discharge water passage 34 that is an example of the first space portion from the second space portion 44 adjacent to the first space portion. The partition wall blocks inflow of water from the discharge water passage 34 into the second space portion 44. The partition wall is provided such that two wall portions are overlapped with each other in association with the forming of the fixation portion 20. Hence, the partition wall includes an upward wall portion 33 that is provided in the first casing member 3 and extends upward from a bottom wall portion 35 defining the discharge water passage 34, and a downward wall portion 43 that extends downward from the lower wall portion 41 on which the guide opening portion 32 is provided.

Accordingly, an end part of the upward wall portion 33 and an end part of the downward wall portion 43 are overlapped with each other at a position higher than a middle part of the partition wall. The end parts overlapped with each other may contact with each other. The upward wall portion 33 and the downward wall portion 43 separate the gutter-shaped space portion below the lower wall portion 31 and the lower wall portion 41 into two space portions that are the discharge water passage 34 and the second space portion 44. Therefore, the upward wall portion 33 and the downward wall portion 43 shield the second space portion 44 such that water falling in the discharge water passage 34 does not flow into the second space portion 44. Accordingly, the water that has passed through the guide opening portion 32 is prevented from penetrating the second space portion 44. Arrows in FIG. 3 show discharge water pathways.

As shown in FIG. 3, a coupling portion 37 that connects inner-wall sides of the both casing members on an inner wall of the fixation portion 20 constitutes a part of an inner wall defining the second space portion 44. The coupling portion 37 is located in a portion of the fixation portion 20, in which an wall part of the first casing member 3 and an inner wall part of the second casing member 4 are joined with each other. In other words, the coupling portion 37 faces and is exposed to the second space portion 44.

Further, the coupling portion 37 is provided at a position higher than a bottom wall portion 36 that is located under the second space portion 44 and defines the second space portion 44. An upper end of the coupling portion 37 is located higher than the fixation portion 20. In other words, a connection portion between the first and second casing members 3 and 4, at which the coupling portion 37 is positioned, is set at a position higher by a predetermined height than the bottom wall portion 36. Even if water penetrates the second space portion 44, the connection portion between the casing members 3 and 4 does not become wet until a water level exceeds the predetermined height in the second space portion 44. Therefore, the water in the second space portion 44 is prevented from leaking out through the connection portion (the fixation portion 20). The coupling portion 37 may be used as an example of a prevention wall that extends from the bottom wall portion 36 in the second space portion 44 and prevents water leakage through the fixation portion 20.

The discharge water passage 34 is the first space portion defined, for example, by a side wall portion of the first casing member 3, the bottom wall portion 35 of the first casing member 3, and the partition wall including the upward wall portion 33 and the downward wall portion 43. The second space portion 44 is a space portion defined, for example, by a side wall portion 45 of the second casing member 4, the bottom wall portion 36 of the first casing member 3, and the partition wall including the upward wall portion 33 and the downward wall portion 43. The side wall portion 45 of the second casing member 4 is opposed to the partition wall and defines the second space portion therebetween.

Operational effects given by the vehicle air conditioner of the first embodiment will be described below. The interior unit 1 of the vehicle air conditioner includes a discharge water passage 34 that is used as the first space portion through which water inside the air conditioning casing 2 flows down from the guide opening portion 32, the discharge water passage 34 communicating with the drainage port 3a, and a partition wall (the upward wall portion 33 and the downward wall portion 43) separating the discharge water passage 34 from the second space portion 44 such that the water falling in the discharge water passage 34 does not flow into the second space portion 44 adjacent to the discharge water portion 34. The coupling portion 37 of the casing members 3, 4 on the inner wall of the fixation portion 20 in which the first casing member 3 and the second casing member 4 are fixed to each other constitutes a part of the inner wall that defines the second space portion 44. The coupling portion 37 is provided at a position higher than the bottom wall portion 36 that defines the second space portion 44.

According to this, the water present inside the air conditioning casing 2 falls from the guide opening portion 32 and reaches the discharge water passage 34. The water falling through the discharge water passage 34 is blocked by the partition wall (the upward wall portion 33 and the downward wall portion 43) and flows down in the discharge water passage 34 without flowing into the second space portion 44. The water flowing down in the discharge water passage 34 is discharged to the exterior from the drainage port 3a communicating with the discharge water passage 34. Accordingly, the water inside the air conditioning casing 2 follows a single discharge water pathway in which the water is discharged through the discharge water passage 34 and the drainage port 3a, and a metallic mold for the casing member of the air conditioning casing 2 can be prevented from being complicated in shape.

Moreover, according to the vehicle air conditioner, even if the water penetrates into the second space portion 44 gradually due to, for example, a long period of use, the water can be accumulated in the second space portion 44 without leaking over the coupling portion 37 until the penetrated water reaches a height of the coupling portion 37 because the coupling portion 37 is provided at the position higher than that of the bottom wall portion 36 defining the second space portion 44. The coupling portion 37 that is an example of the prevention wall is distant from the partition wall to be capable of accumulating water in the second space portion 44. More specifically, the coupling portion 37 is in contact with the side wall portion 45. Since the water inside the air conditioning casing 2 flows down in the discharge water passage 34 in principle without flowing into the second space portion 44, an amount of the water that penetrates the second space portion 44 is little, and the penetrated water evaporates spontaneously over time.

Since the vehicle air conditioner discharges the water inside the air conditioning casing 2 from the drainage port 3a communicating with the single discharge water passage 34, the number of components, a manufacturing cost of the metallic mold and a cost for components can be limited. Further, since the coupling portion 37 of the fixation portion 20 does not face the discharge water passage 34, there is no need to provide a packing in the fixation portion to prevent water leakage. Accordingly, the vehicle air conditioner can be provided, which requires no receiver, such as a drain pan, of leaked water from the fixation portion.

Moreover, the flow guide 42 having a tapered lower end is provided at the inner circumferential edge part defining the guide opening portion 32 in the air conditioning casing 2. According to this, when the water inside the air conditioning casing 2 falls from the guide opening portion 32, the water flows down on the surface of the flow guide 42 and becomes a water droplet at the tapered part, thereby dropping in the discharge water passage 34. Hence, the water can be prevented from flying apart toward the second space portion 44, and thus a pathway in which the water is discharged to the drainage port 3a via the discharge water passage 34 without flowing into the second space portion 44 can be developed surely. Additionally, in terms of preventing water flying toward the second space portion 44, the flow guide 42 may be provided at least in a part near to the partition wall within the inner circumferential edge part of the guide opening portion 32.

(Second Embodiment)

Figure 4:
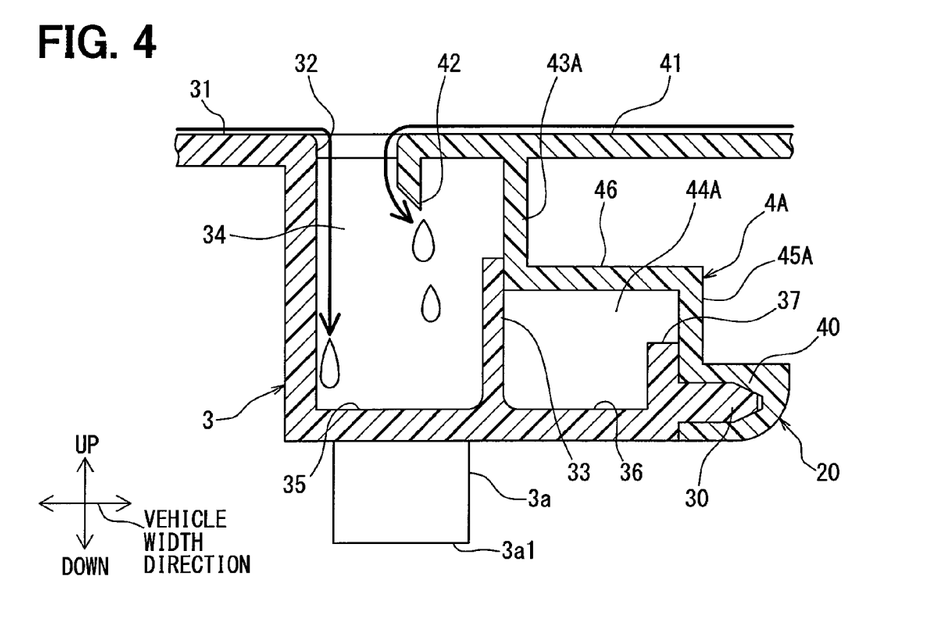
FIG. 4 is a schematic sectional diagram showing a part of an air conditioning casing used for a vehicle air conditioner according to a second embodiment of the present disclosure.

In a second embodiment, a vehicle air conditioner having a different configuration from the first embodiment will be described with reference to FIG. 4. In the second embodiment, only a part regarding a discharge water pathway shown in FIG. 4 is different from FIG. 3 of the first embodiment. In the second embodiment, a component assigned the same numeral as that in the drawings of the first embodiment and a configuration without an explanation are similar to those of the first embodiment and exert similar operational effects.

As shown in FIG. 4, a partition wall of the second embodiment includes an upward wall portion 33 provided in a first casing member 3 so as to extend upward from a bottom wall portion 35 that defines the discharge water passage 34, and an outer wall portion 43A that extends downward from a lower wall portion 41 of a second casing member 4A and is exposed to an exterior of the air conditioning casing 2. The upward wall portion 33 and the outer wall portion 43A are overlapped with each other. Accordingly, the discharge water passage 34 is a first space portion defined, for example, by a side wall portion of the first casing member 3, a bottom wall portion 35 of the first casing member 3, and the partition wall including the upward wall portion 33 and the outer wall portion 43A. A second space portion 44A is a space portion defined, for example, by a side wall portion 45A extending upward from a groove portion 40 of a fixation portion 20 in the second casing member 4A, the bottom wall portion 36 of the first casing member 3, the upward wall portion 33, and an upper wall portion 46 extending approximately perpendicularly from an end part the outer wall portion 43A and is connected to an end part of the side wall portion 45A. The coupling portion 37 is distant from the partition wall and is in contact with the side wall portion 45A.

According to the second embodiment, since the partition wall is provided such that the upward wall portion 33 and the outer wall portion 43A are overlapped with each other, a metallic mold for a casing member of the air conditioning casing 2 can be simplified in shape, and contribution can be made for restriction of a manufacturing cost of the metallic mold.

(Third Embodiment)

Figure 5:
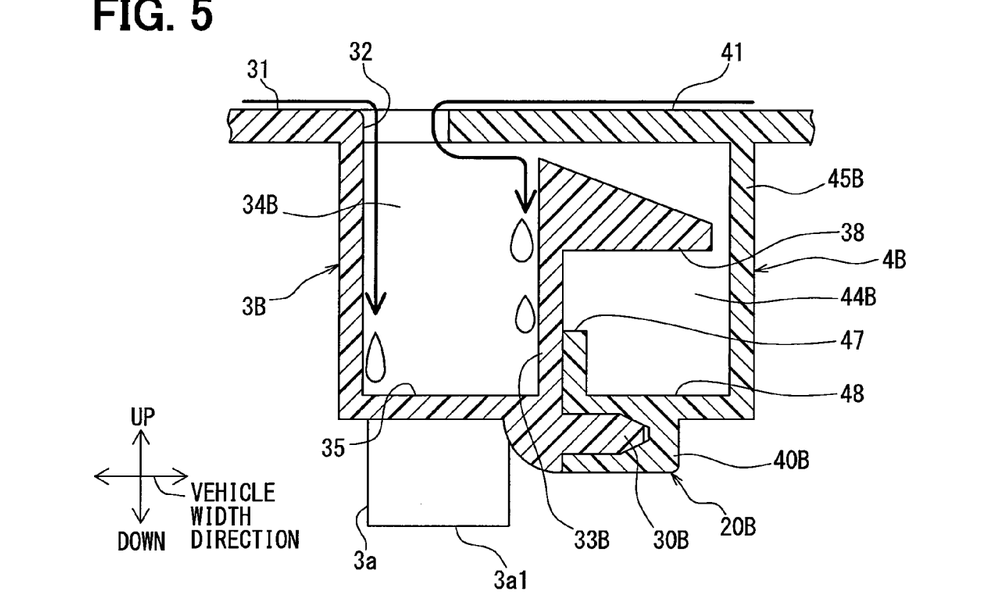
FIG. 5 is a schematic sectional diagram showing a part of an air conditioning casing used for a vehicle air conditioner according to a third embodiment of the present disclosure.

In a third embodiment, a vehicle air conditioner having a different configuration from the first embodiment will be described with reference to FIG. 5. In the third embodiment, only a part regarding a discharge water pathway shown in FIG. 5 is different from FIG. 3 of the first embodiment. In the second embodiment, a component assigned the same numeral as that in the drawings of the first embodiment and a configuration without an explanation are similar to those of the first embodiment and exert similar operational effects.

As shown in FIG. 5, a partition wall of the third embodiment includes an upward wall portion 33B provided in a first casing member 3B. The upward wall portion 33B is a wall portion extending upward from a bottom wall portion 35 defining a discharge water passage 34B to a height such that water falling from a guide opening portion 32 does not flow into a second space portion 44B. The height of an upper end part of the upward wall portion 33B is set such that the water falling from the guide opening portion 32 hits against a side surface of the upward wall portion 33B and flows down on the side surface without flying into the second space portion 44B. The vehicle air conditioner described in the third embodiment includes the upward wall portion 33B in which the upper end part is set at the height so as to exert such effects.

According to this configuration, when water inside an air conditioning casing 2 drops down from the guide opening portion 32, the water flows down on the upward wall portion 33B and flows out to the discharge water passage 34B from a base part of the upward wall portion 33B. Hence, the water can be prevented from flying into the second space portion 44B, and a pathway in which the water is discharged to the drainage port 3a via the discharge water passage 34B without flowing into the second space portion 44B can be provided surely. Further, since the upward wall portion 33B constitutes the partition wall, a metallic mold for a casing member of the air conditioning casing 2 can be further simplified in shape, and contribution can be made for restriction of a manufacturing cost of the metallic mold.

Further, the upward wall portion 33B includes an upper end part 38 extending substantially across an upper area of the second space portion 44B, in terms of preventing water flying into the second space portion 44B. In other words, the upward wall portion 33B has an inverted L shape in vertical section. Additionally, the end part 38 of the upward wall portion 33B preferably extends to be adjacent to a side wall portion 45B of a second casing member 4B, in terms of preventing water flying to the second space portion 44B.

A fixation portion 20B is provided by combining and fixing a protrusion portion 30B of the first casing member 3B and a groove portion 40B of the second casing member 4B to each other. The first casing member 3B and the second casing member 4B are combined with each other due to the providing of the fixation portion 20B, and a gutter-shaped space portion (the discharge water passage 34B and the second space portion 44B) is provided below a lower wall portion 31 and a lower wall portion 41.

Accordingly, in the third embodiment, the discharge water passage 34B is a first space portion defined, for example, by a side wall portion of the first casing member 3B, the bottom wall portion 35 of the first casing member 3B, and the partition wall including the upward wall portion 33B. The second space portion 44B is a space portion defined, for example, by the side wall portion 45B extending upward from the groove portion 40B constituting the fixation portion 20B in the second casing member 4B, a bottom wall portion 48 of the second casing member 4B, and the partition wall including the upward wall portion 33B.

As shown in FIG. 5, a coupling portion 47 that connects inner-wall sides of the first and second casing members 3B and 4B on an inner wall of the fixation portion 20B constitutes a part of an inner wall defining the second space portion 44B. The coupling portion 47 is located in a portion connecting an inner wall part of the first casing member 3B and an inner wall part of the second casing member 4B in the fixation portion 20B. Therefore, the coupling portion 47 faces and is exposed to the second space portion 44B.

Further, the coupling portion 47 is provided at a higher position than the bottom wall portion 48 defining the second space portion 44B. An upper end of the coupling portion 47 is higher than the fixation portion 20B. In other words, the connecting portion configured by the coupling portion 47 between the two casing members is set at a higher position than the bottom wall portion 48 by a predetermined height. Even if water enters the second space portion 44B, the connecting portion between the two casing members can be prevented from becoming wet, and the water in the second space portion 44B can be thus prevented from leaking out through the connecting portion, until a water level exceeds the predetermined height. The coupling portion 47 may be used as an example of the prevention wall. The coupling portion 47 is distant from the side wall portion 45B to be capable of accumulating water in the second space portion 44B. As shown in FIG. 5, the coupling portion 47 may contact the upward wall portion 33B.

In the above, the preferable embodiments of the present disclosure are described, but the present disclosure is not limited to the above-described embodiments and can be changed variously without departing from the scope of the present disclosure. The configurations of the above-described embodiments are just examples, and the scope of the present disclosure is not limited to these descriptions.

In the above-described embodiments, the drainage port 3a is provided in the first casing member but is not limited to the embodiments. The drainage port 3a may be provided in the second casing member.

In the above-described first and second embodiments, the partition wall separating between the discharge water passage 34 and the second space portion 44, 44A includes the two wall portions having the end parts contacting each other, but the partition wall of the present disclosure is not limited to this configuration. It is only necessary that the end parts of the two wall portions are overlapped with each other. In other words, it is only necessary that the partition wall separate as a single wall portion between the discharge water passage 34 and the second space portion 44, 44A when the partition wall is viewed in a horizontal direction. For example, a space may be provided between the end parts of the two wall portions. In other words, the downward wall portion 43 or the outer wall portion 43A may not necessarily contact the upward wall portion 33, it is only necessary that the downward wall portion 43 or the outer wall portion 43A is overlapped with the upward wall portion 33 when viewed in a direction perpendicular to the partition wall. Accordingly, the partition wall may have a labyrinth-like structure in which a space is provided between the downward wall portion 43 or the outer wall portion 43A and the upward wall portion 33.

Figure 6:
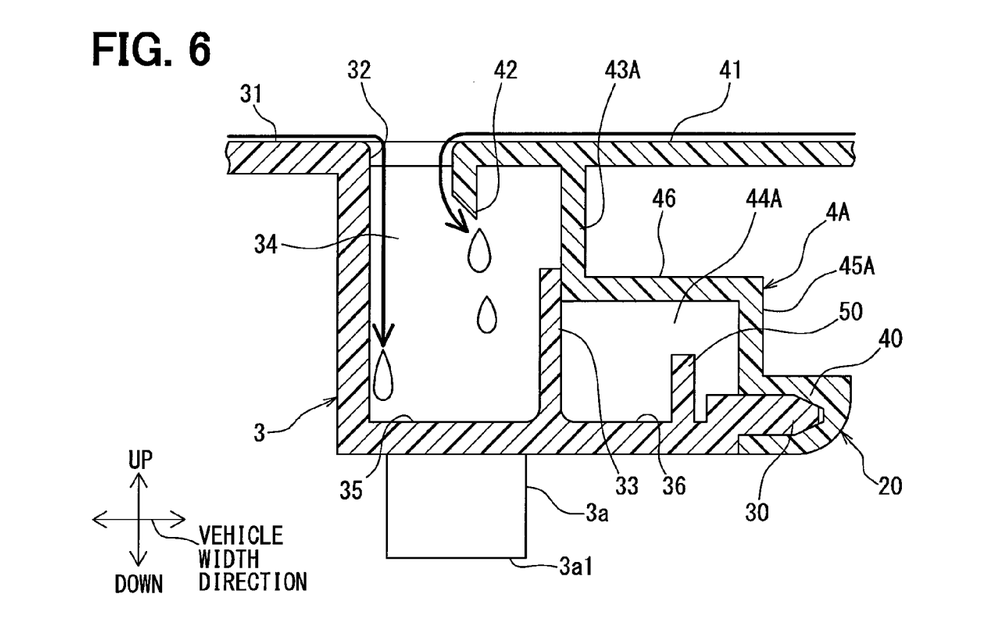
FIG. 6 is a schematic sectional diagram showing a part of an air conditioning casing used for a vehicle air conditioner according to a modification of the present disclosure.

In the above-described embodiments, the coupling portion 37, 47 is used as an example of the prevention wall that prevents water leakage through the fixation portion 20. However, as shown in FIG. 6, a protrusion wall 50 extending upward from the bottom wall portion 36 in the second space portion 44A may be used as the prevention wall. The protrusion wall 50 is provided at a position distant from both the upward wall portion 33 and the side wall portion 45A. In other words, the protrusion wall 50 does not contact the upward wall portion 33 or the side wall portion 45A. The protrusion wall 50 can be applied to the vehicle air conditioners according to the above-described first to third embodiments. When the protrusion wall 50 is applied to the first and second embodiments, the protrusion wall 50 is provided in the first casing member 3. When the protrusion wall 50 is applied to the third embodiment, the protrusion wall 50 is provided in the second casing member 4B.

What is claimed is:

1. A vehicle air conditioner comprising:
an air conditioning casing having therein an air passage through which air flows to be blown into a vehicle compartment, the air conditioning casing including a first casing member and a second casing member and being configured such that at least the first casing member and the second casing member are combined with each other; and
a heat exchanger disposed inside the air conditioning casing to adjust a condition of air that is to be blown into the vehicle compartment, wherein
the air conditioning casing includes:
a guide opening portion communicating with the air passage such that water inside the air conditioning casing flows into the guide opening portion;
a first space portion communicating with the guide opening portion such that the water falling from the guide opening portion due to gravity flows down in the first space portion;
a drainage port communicating with the first space portion to discharge the water, which has flowed down from the first space portion, to an exterior of the air conditioning casing;
a second space portion located adjacent to the first space portion, the second space portion being provided with no drainage port;
a partition wall separating between the first space portion and the second space portion such that the water falling in the first space portion is prevented from entering the second space portion;
a bottom wall portion provided under the second space portion and defining the second space portion;
a prevention wall extending upward from the bottom wall portion in the second space portion; and
a fixation portion in which the first casing member and the second casing member are fixed to each other, and
an upper end of the prevention wall is higher than a position of the fixation portion.

2. The vehicle air conditioner according to claim 1, wherein the air conditioning casing further includes a flow guide extending downward from an inner circumferential edge part of the guide opening portion and having a tapered shape.

3. The vehicle air conditioner according claim 1, wherein
the air conditioning casing includes an upward wall portion extending upward from a bottom wall portion that defines the first space portion, and an outer wall portion extending downward from a part of the air conditioning casing on which the guide opening portion is provided, the outer wall portion being exposed to the exterior of the air conditioning casing, and
the upward wall portion and the outer wall portion are overlapped with each other to constitute the partition wall.

4. The vehicle air conditioner according to claim 1, wherein
the air conditioning casing includes an upward wall portion extending upward from a bottom wall portion defining the first space portion to a height to prevent the water, falling from the guide opening portion, from flowing into the second space portion, and
the upward wall portion constitutes the partition wall.

5. The vehicle air conditioner according to claim 4, wherein the upward wall portion includes an upper end part extending substantially across an upper area of the second space portion.

6. The vehicle air conditioner according to claim 1, wherein
the air conditioning casing further includes a side wall portion that is opposed to the partition wall and defines the second space portion,
the prevention wall is provided in the first casing member,
the side wall portion is provided in the second casing member, and
the prevention wall is distant from the partition wall.

7. The vehicle air conditioner according to claim 6, wherein the prevention wall is in contact with the side wall portion.

8. The vehicle air conditioner according to claim 3, wherein
the air conditioning casing further includes a side wall portion that is opposed to the partition wall and defines the second space portion,
the upward wall portion is provided in the first casing member,
the prevention wall is provided in the second casing member, and
the prevention wall is distant from the side wall portion.

9. The vehicle air conditioner according to claim 8, wherein the prevention wall is in contact with the side wall portion.

10. The vehicle air conditioner according to claim 1, wherein the bottom wall portion includes a non-drained surface configured to accumulate water in the second space portion to evaporate even when the water enters the second space portion.

* * * * *